United States Patent [19]

Katsurabayashi

[11] Patent Number: 5,408,662
[45] Date of Patent: Apr. 18, 1995

[54] SYSTEM FOR PERFORMING A COOPERATIVE OPERATION ON COMMON DATA

[75] Inventor: Hiroshi Katsurabayashi, Kanagawa, Japan

[73] Assignee: Fuji Xerox Co., Ltd., Tokyo, Japan

[21] Appl. No.: 92,609

[22] Filed: Jul. 16, 1993

[30] Foreign Application Priority Data

Jul. 17, 1992 [JP] Japan .................................. 4-212324

[51] Int. Cl.⁶ .......................... G06F 11/00; G06F 9/46
[52] U.S. Cl. .................................... 395/650; 395/575;
395/425; 364/DIG. 1; 364/264; 364/264.5;
364/228.1; 364/222.81; 364/232.9
[58] Field of Search ................. 395/425, 200, 650, 575

[56] References Cited

U.S. PATENT DOCUMENTS

| | | | |
|---|---|---|---|
| 3,886,525 | 5/1975 | Brown et al. .................. | 364/DIG. 1 |
| 4,974,173 | 11/1990 | Stefik et al. ......................... | 364/521 |
| 5,008,853 | 4/1991 | Bly et al. ......................... | 364/DIG. 2 |
| 5,220,657 | 6/1993 | Bly et al. ............................... | 395/425 |

FOREIGN PATENT DOCUMENTS

| | | |
|---|---|---|
| 2-2450 | 1/1990 | Japan . |
| 3-58658 | 3/1991 | Japan . |
| 3-119476 | 5/1991 | Japan . |
| 3-119477 | 5/1991 | Japan . |
| 3-119478 | 5/1991 | Japan . |

OTHER PUBLICATIONS

"Multimedia Dispersed Seats Meeting System MERMAID", Watanabe et al., Transactions of Information Processing Society of Japan, vol. 32, No. 9, Sep. 1991, pp. 1200–1209.

"Semistructured Messages Are Surprisingly Useful for Computer-Supported Coordination", Malone et al., ACM Transactions on Office Information Systems, vol. 5, No. 2, pp. 115–131, Apr. 1987.

"WYSIWIS Revised: Early Experiences with Multi-user Interfaces", Stefik et al., ACM Transactions on Office Information Systems, vol. 5, No. 2, pp. 147–167, Apr. 1987.

"Intelligent Information-Sharing Systems", Malone et al., Communications of the ACM, vol. 30, No. 5, pp. 390–402, May 1987.

"Team WorkStation: Towards a Seamless Shared Workspace", Ishii, H., CSCW 90 Proceedings, pp. 13–26, Oct. 1990.

Primary Examiner—Eddie P. Chan
Attorney, Agent, or Firm—Finnegan, Henderson, Farabow, Garrett & Dunner

[57] ABSTRACT

A cooperative operation system in which a plurality of operators use workstations to perform a cooperative operation by use of common data. The cooperative operation system includes a common data monitoring unit for monitoring operations to be performed on the common data by the respective operators, a notifying level information storage unit for storing notifying level information used to decide notifying modes in which the operations by the operators are notified to the other operators, a notifying information creating unit for creating notifying information on the basis of the information from the common data monitoring unit and the notifying level information from the notifying level information storage unit, a notifying information decoding unit for decoding the notifying information transmitted and for deciding a notifying mode corresponding to a notifying level included in the notifying information, and a notifying information supply unit for supplying the notifying information to the operators in accordance with the notifying mode decided by the notifying information decoding unit.

11 Claims, 14 Drawing Sheets

FIG. 3

| DATA ID | NOTIFYING DESTINATION | OPERATOR LIMITATION | NOTIFYING LEVEL A (IMMEDIATE DISPLAY) | NOTIFYING LEVEL B (STORAGE) | NOTIFYING LEVEL C (MAIL) |
|---|---|---|---|---|---|
| 1 | asan | none | LOCK, OPEN | POSTING | MOVEMENT, PARTIAL MOVEMENT |
| | bsan | asan | CLOSE, UNLOCK | POSTING | MOVEMENT, PARTIAL MOVEMENT |
| | csan | none | POSTING | OPEN | LOCK |
| | dsan | none | POSTING | OPEN | LOCK |
| | esan | none | POSTING | OPEN | LOCK |
| | fsan | dsan | POSTING | OPEN | LOCK |
| ⋮ | | | | | |
| 100 | asan | none | LOCK, OPEN | POSTING | MOVEMENT, PARTIAL MOVEMENT |
| | bsan | asan | CLOSE, UNLOCK | POSTING | MOVEMENT, PARTIAL MOVEMENT |
| | csan | none | POSTING | OPEN | LOCK |
| | dsan | none | POSTING | OPEN | LOCK |
| | esan | none | POSTING | OPEN | LOCK |
| | fsan | dsan | POSTING | OPEN | LOCK |

FIG. 4

| NOTIFYING INFORMATION IDENTIFIER | NOTIFYING DESTINATION | DATA ID | NOTIFYING LEVEL | OPERATION CONTENT | FILE NAME | OPERATOR |
|---|---|---|---|---|---|---|
| EXAMPLE | | | | | | |
| 1 | asan | 58 | A | OPEN | "1. AT THE BEGINNING" | csan |

FIG. 5

| NOTIFYING INFORMATION IDENTIFIER | DATA ID | USER'S NAME | NOTIFYING LEVEL & OPERATION CONTENT | OPERATOR |
|---|---|---|---|---|
| EXAMPLE | | | | |
| 2 | 59 | dsan | "(A LOCK, OPEN, CLOSE, UNLOCK) (B DELETION, POSTING, PARTIAL POSTING) (C MOVEMENT, PARTIAL MOVEMENT)" | esan |

FIG. 6

| NOTIFYING INFORMATION IDENTIFIER | USER'S NAME | ADDRESS | USER'S NAME | ADDRESS | ... |
|---|---|---|---|---|---|
| 3 | asan | 129.29.56.3 | esan | 129.29.56.8 | |

EXAMPLE

FIG. 7

| NOTIFYING LEVEL CHANGE | | | |
|---|---|---|---|
| OPERATION | NOTIFYING LEVEL | | |
| LOCK | IMMEDIATE | STORAGE | MAIL |
| OPEN | IMMEDIATE | STORAGE | MAIL |
| CLOSE | IMMEDIATE | STORAGE | MAIL |
| UNLOCK | IMMEDIATE | STORAGE | MAIL |
| DELETION | IMMEDIATE | STORAGE | MAIL |
| POSTING | IMMEDIATE | STORAGE | MAIL |
| POSTING | IMMEDIATE | STORAGE | MAIL |
| OPERATOR | | | |

FIG. 8

| NOTIFICATION | |
|---|---|
| FILE NAME | FX TECHNICAL REPORT>FOR FILING (1PAGE 2PAGE) |
| OPERATION CONTENT | POSTING |
| OPERATOR | dsan |
| NOTIFYING DESTINATION | dsan, asan, csan |

FIG. 9

| STATE | NAME | | | |
|---|---|---|---|---|
| | DATABASE WORKSHOP | | | |
| | DRAFT (B4, 2 STAGE) | | | |
| | FX TECHNICAL REPORT 6 | | | |
| | FOR FILING (1 PAGE 2 PAGE) | | | |
| | OUTLINE OF WRITER'S CAREER | | | |
| | ENGLISH TEXT (ABSTRACT) | | | |

CLOSE · REDISPLAY · LOCK · CHECK-IN

NOTIFICATION

| FILE NAME | FX TECHNICAL REPORT >FOR FILING(1PAGE 2PAGE) |
| --- | --- |
| OPERATION CONTENT | POSTING |
| OPERATOR | dsan |
| NOTIFYING DESTINATION | dsan, asan, osan |

| | | | |
|---|---|---|---|
| 1 | BODY | 1991, 2.21 | 14:26:66 |
| 1 | BODY | ... | |
| 1 | BODY | '99 . 6.27 | '4:48.24 |
| 1 | BODY | 1991, 7.1 | 11:27:31 |
| 1 | BODY | 1991, 6.30 | 18:30:44 |

SYSTEM FOR PERFORMING A COOPERATIVE OPERATION ON COMMON DATA

BACKGROUND OF THE INVENTION

1. Field of the Invention

The present invention relates to a cooperative operation system in which a plurality of operators use workstations to perform a cooperative operation by use of common data.

2. Description of the Related Art

Conventionally, there is known a method of sharing data in common through a network when a plurality of operators perform cooperative operations (for example, the Drawer in the JStar workstation by Xerox Corporation described in the "Workstation Series JStar Workstation," edited by Akihiro Kamitani and published by Maruzen in 1986, and the Shared Book described in Japanese Patent Unexamined Publication No. Hei. 2-2450 entitled "Expression of Cooperative Multi-User Activities Relating to Commonly Usable Structure Data Object in a Network Workstation Environment"). That is, in such conventional cooperative operation systems, for example, in order that a plurality of operators write a book in collaboration with one another, when the operation is divided among the operators by chapters or the like and the operators are going to make their respective compositions, there is secured a storage location to store common data and each of the operators places a reference for the storage location on the desk top of the workstation of his or her own. Each of the operators makes compositions on the desk top of the workstation of his or her own, and at a proper timing stores the compositions in the storage location shown by the reference. The remaining operators are able to refer to the thus stored compositions by opening the reference icon. Also, in order to prevent the same composition from being corrected at the same time by the other operator or operators, there is employed an exclusive control which permits only one operator to correct the composition. Further, there can be obtained information as to who is editing a composition and who is the last to have edited the composition. As a result of this, the consistency of the common data can be secured and thus the cooperative operation can be performed.

Also, as a method of obtaining necessary information out of large files of information, there are known a method in which various pieces of information (or mails) sent are classified by a classifying method which has been previously specified, and a method of receiving only the information (or mails) that accords with a previously specified key word (for example, Object Lens of MIT described in Malone, T. W., Grant, K. R., Lai, K. Y., Rao, R. and Rosenblitt, D. "Semistructured Messages are Surprisingly Useful for Computer-Supported Coordination," ACM Transactions on Office Information Systems, Vol. 5, No. 2, April 1987, pp. 115-131, and Malone, T. W., Grant, K. R., Turbak, F. A., Brobst, S. A., and Cohen, M. D., "Intelligent Information-Sharing Systems", Communications of the ACM, May 1987 Volume 30 Number 5, pp. 390-402). That is, in these conventional systems, if the key word has been previously specified, when a plurality of operators are performing in collaboration with one another, the operators are able to check whether the key word is included in the incoming information or not, and thus are able to select the necessary information out of large files of incoming information. As a result of this, the information can be selected without troubling the operators.

Further, there is conventionally known a system in which messages are exchanged in real time through a network by use of workstations for example, the Colab System by the Palo Alto Research of Xerox described in Stefik, M., Bobrow, D. G., Foster, G., Lanning S., and Tatar, D., "WYSIWIS Revised: Early Experiences with Multiuser Interfaces", ACM Transactions on Office Information Systems, Vol. 5, No. 2, April 1987, pp. 147–167; NTT's TeamWorkstation described in Ishii, Hiroshi, "Team Workstation: Towards a Seamless Shared Workspace", CSCW 90 Proceedings, October 1990, pp. 13–26; Japanese Patent Unexamined No. Hei. 3-119476, "Shared Screen Control System," Japanese Patent Unexamined Publication No. Hei. 3-119477, "Shared Screen Control System," and Japanese Patent Unexamined Publication No. Hei. 3-119478, "Shared Screen Control System"; and NEC's MERMAID described in Kazuo Watanabe, Shiroh Sakata, Kazutoshi Maeno, Hideyuki Fukuoka, and Toyoko Ohmori, "Multimedia Dispersed Seats Meeting System MERMAID", Transactions of Information Processing Society of Japan, Vol. 32, No. 9, September 1991, pp. 1200–1209 and Japanese Patent Unexamined Publication No. Hei. 3-358658, "Dispersed Meeting System"). That is, in these conventional systems, for example, when a plurality of operators respectively at remote places make arrangements with one another, the addresses of the workstations being used by the operators are specified and an arrangement-making group is formed, whereby an application program necessary for the arrangement is initiated to thereby exchange messages therebetween. As a result of this, two or more operators are able to make arrangements with one another by use of their workstations.

In addition, conventionally, there is also known a system which has a function to automatically notify the change of common data and the like (for example, the access notifying device described in Japanese Patent Unexamined Publication No. Hei. 3-117246, "Access Notifying Device"). That is, in such a conventional system, the common data is retrieved at a given time interval or in accordance with a request from one or more operators, and the change of the common data is examined and notified. As a result of this, all persons that use the common data are able to know the fact that the common data has been accessed.

However, in the conventional common data systems (for example, the Drawer in the JStar workstation by Xerox Corporation described in the "Workstation Series JStar Workstation," edited by Akihiro Kamitani and published by Maruzen in 1986, and the Shared Book described in Japanese Patent Unexamined Publication No. Hei. 2-2450 entitled "Expression of cooperative multi-user activities relating to commonly usable structure data object in a network workstation environment"), the operators are able to know only the information on locking for the exclusive control and the information on the person who has corrected the data last. That is, the operators are not able to know the information on the cooperative operators who are now referring to a certain file, information on the cooperative operators who have referred to the file, information on the fact that a certain file has been copied and information on the fact that a certain file was referred to and was then closed, with the result that the operators lose a timing for communication with the cooperative operators or collaborators.

Also, due to the fact that the information is selected by use of a key word or an attribute in a message intentionally made by the partner of the cooperative operation, the collaborator cannot find out all the details of the information on an operation for a specific file and the information on an operation for a specific person. That is, it is impossible to find out what is not sent as a message by the collaborator or collaborators even if any key word is prepared. This means that the information cannot be selected and necessary information cannot be obtained (for example, MIT's Object Lens described in Malone, T. W., Grant, K. R., Lai, K. Y., Rao, R. and Rosenblitt, D. "Semistructured Messages are Surprisingly Useful for Computer-Supported Coordination," ACM Transactions on Office Information Systems, Vol. 5, No. 2, April 1987, pp. 115–131, and Malone, T. W., Grant, K. R., Turbak, F. A., Brobst, S. A., and Cohen, M. D., "Intelligent Information-Sharing Systems," Communications of the ACM, May 1987 Volume 30 Number 5, pp. 390–402).

Further, when the cooperative operator is going to make an arrangement or an adjustment with the cooperative operators who are collaborating a certain operation, the cooperative operator has to search the names of the cooperative operators and the addresses of the workstations being used by them before he starts an application for the arrangement, resulting in the complicated operation (for example, the Colab System by the Palo Alto Research of Xerox described in Stefik, M., Bobrow, D. G., Foster, G., Lanning S., and Tatar, D., "WYSIWIS Revised: Early Experiences with Multi-user Interfaces", ACM Transactions on Office Information Systems, Vol. 5, No. 2, April 1987, pp. 147–167; NTT's TeamWorkstation described in Ishii, Hiroshi, "Team Workstation: Towards a Seamless Shared Workspace", CSCW 90 Proceedings, October 1990, pp. 13–26, Japanese Patent Unexamined No. Hei. 3-119476, "Shared Screen Control System," Japanese Patent Unexamined Publication No. Hei. 3-119477, "Shared Screen Control System," and Japanese Patent Unexamined Publication No. Hei. 3-119478, "Shared Screen Control System"; and NEC's MERMAID described in Kazuo Watanabe, Shiroh Sakata, Kazutoshi Maeno, Hideyuki Fukuoka, and Toyoko Ohmori, "Multimedia Dispersed Seats Meeting System MERMAID", Transactions of Information Processing Society of Japan, Vol. 32, No. 9, September 1991, pp. 1200–1209 and Japanese Patent Unexamined Publication No. Hei. 3-358658, "Dispersed Meeting System").

Moreover, in the conventional system (for example, the access notifying device described in Japanese Patent Unexamined Publication No. Hei. 3-117246, "Access Notifying Device") which has a function to notify automatically the change of the common data and the like, the change of the common data is notified at a given time interval or in accordance with a request from the operator or operators, the operator is not able to know, at a time when the operator accesses the common data, the fact that the common data is changed.

In addition, in the case of the operation whose operation trace is not left in the common data, it is not possible to detect the existence of the operation and thus notify the operation.

SUMMARY OF THE INVENTION

The present invention aims at eliminating the above problems found in the conventional systems. Accordingly, it is an object of the invention to provide a cooperative operation system which can notify the operation of cooperative operators, can specify the sure selection of notifying information and the notifying method of the notifying information, and can generate automatically communication addresses necessary for arrangement and adjustment so the arrangement can be held in real time.

In order to attain the above object, the invention provides a cooperative operation system in which a plurality of operators perform a cooperative operation by use of common data, the system including common data monitoring means for monitoring operations to be performed on the common data by the respective operators, notifying level information storage means for storing notifying level information used to decide notifying modes in which the operations by the operators are notified to the other operators, notifying information creating means for creating notifying information on the basis of the information from the common data monitoring means and the notifying level information from the notifying level information storage means, notifying information decoding means for decoding the notifying information transmitted and for deciding a notifying mode corresponding to a notifying level included in the notifying information, and notifying information supply means for supplying the notifying information to the operators in accordance with the notifying mode decided by the notifying information decoding means.

BRIEF DESCRIPTION OF THE DRAWINGS

FIG. 3 is a view showing the structure of notifying level information;

FIG. 4 is a view showing the structure of notifying data;

FIG. 5 is a view showing the structure of notifying level change data;

FIG. 6 is a view showing the structure of arrangement participant data;

FIG. 7 is a view showing an example of the screen display of a notifying level setting window;

FIG. 8 is a view showing an example of the screen display of a notifying information window;

FIG. 9 is a view showing an example of the screen display of notifying information;

DETAILED DESCRIPTION OF THE PREFERRED EMBODIMENTS

Description will be given hereinbelow of the embodiments of a cooperative operation system according to the invention with reference to the accompanying drawings.

Figure 1:
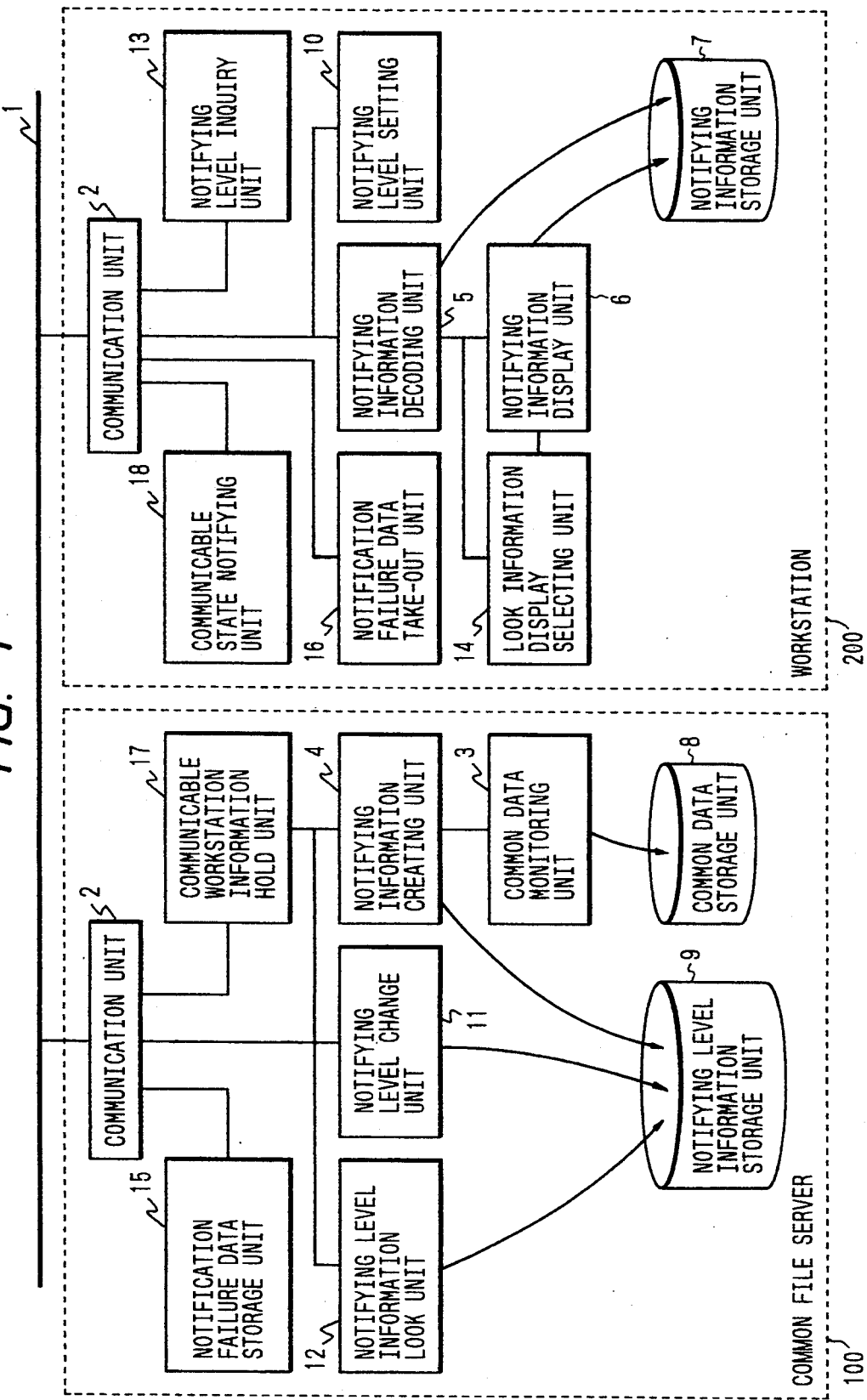
FIG. 1 is a block diagram showing a first embodiment of a cooperative operation system according to the invention.

FIG. 1 is a block diagram showing an embodiment of the cooperative operation system according to the invention. The present cooperative operation system is a combination of a common file server 100, which is common data managing means, and a workstation 200, both of which are connected to a network 1, and the system further includes the following composing elements 2 to 18.

A communication unit 2 is a device which communicates through the network 1.

A common data monitoring unit 3 monitors various operations to be performed on a common data storage unit 8 by operators and transmits information on the operations to a notifying information creating unit 4.

The notifying information creating unit 4 is triggered by the transmission of the information from the common data monitoring unit 3, refers to a notifying level information storage unit 9, and decides the forms of notification and the partners to be notified to thereby create notifying information.

A notifying information decoding unit 5 receives the transmitted notifying information from the communication unit 2, judges the notifying level of the notifying information, for example, whether the information must be notified immediately or not, and decides the notifying methods (modes of notification) of the information to the operators.

A notifying information storage unit 7 stores the notifying information that has been judged not necessary to be notified by the notifying information decoding unit 5, and supplies the notifying information according to an inquiry from a notifying information display unit 6.

The notifying information display unit 6 transmits the information to the operators in accordance with the information from the notifying information decoding unit 5, and displays the information that is stored in the notifying information storage unit 7 in accordance with an instruction by the operator.

A notifying level setting unit 10 dialogues with the operators to set the notifying levels, and transmits the notifying levels through the communication unit 2 to a notifying level change unit 11.

The notifying level change unit 11 updates the notifying level information storage unit 9 on the basis of the notifying level data transmitted thereto through the communication unit 2.

A notifying level inquiry unit 13, in accordance with an instruction by the operator, inquires the contents of the notifying level information storage unit 9 held by the common file server 100 of a notifying level information look unit 12.

Responsive to a request from the notifying level inquiry unit 13, the notifying level information look unit 12 creates notifying level information look data on the basis of the notifying level information and then transmits the look data to the workstation 200. The transmitted notifying level information look data are decoded by the notifying information decoding unit 5 and are then displayed by the notifying information display unit 6 to be delivered to the operator.

A look information display selecting unit 14, at a stage where the transmitted notifying level information look data are displayed to the operator, selects the information to be displayed in accordance with the instruction by the operator, and displays only the information that is instructed.

A notification failure data storage unit 15, when the common file server 100 tries to notify the workstation 200 but in vain, stores the notifying information that is transmitted from the communication unit 2 thereto, and also transmits the notification failure to communicable workstation information hold unit 17.

A notification failure data take-out unit 16, when instructed by the operator, offers a take-out request through the communication unit 2 to the notification failure data storage unit 15 and, on receipt of the take-out request from the take-out unit 16, the notification failure data storage unit 15 transmits to the workstation 200 the notifying information that is stored therein.

The communicable workstation information hold unit 17 transmits to the communication unit 2 the notifying information for the communicable workstation or workstations out of the notifying information that is created in the notifying information creating unit 4, while the information hold unit 17 also transmits the uncommunicable information to the notification failure data storage unit 15. When the information hold unit 17 receives from the communication unit 2 the information on the notification failure, the unit 17 deletes the information on the associated workstation or workstations.

A communicable state notifying unit 18, after the power supply of the workstation 200 is turned on, notifies the common file server 100 that the workstation 200 is in the communicable state. Also, when a reference icon is used as an access point to the common file server 100, at a time when the reference icon is opened, the communicable state notifying unit 18 notifies the common file sever 100 that the workstation 200 is the communicable state. Further, in accordance with an instruction which is given by the operator and which notifies that the workstation 200 is in the communicable state, the communicable state notifying unit 18 notifies the common file server 100 that the workstation 200 is in the communicable state. On receipt of the information that the workstation 200 is in the communicable state from the communicable state notifying unit 18, the common file server 100 transmits the information to the communicable workstation information hold unit 17. Then, the communicable workstation information hold unit 17 adds to the communicable workstation information the workstation that has transmitted the information that it is in the communicable state.

Referring now to FIG. 3, there is shown a view of the structure of notifying level information which is used by the notifying information creating unit 4 in order to decide whether notification is possible or not.

In FIG. 3, "data ID" designates an identifying character to specify data in the common data.

The term "operator limitation" means information which is used to judge to whose operation the notification is given. If this information is none, then the notification is given to the operations performed by any of the collaborators.

The term "notifying level" means information which is used to decide a level at which the notification is given to which operation content.

FIG. 4 is a view showing the structure of notifying data which is transmitted to the workstation by the common file server when any operation is performed on the common data. In particular, the notifying data includes information on notifying information identifier, notifying destination, data ID, notifying level, operation content, file name, operator and the like.

FIG. 5 is a view showing the structure of information for change of notifying level information which is transmitted to the common file server by the notifying level setting unit 10 shown in FIG. 1. In particular, the information includes information on notifying information identifier, data ID, user's name, notifying level & operation content, operator and the like. The notifying level information to be changed is specified by this information and then the specified notifying level information is changed in accordance with the content of the items of the notifying level & operation content.

Figure 2:
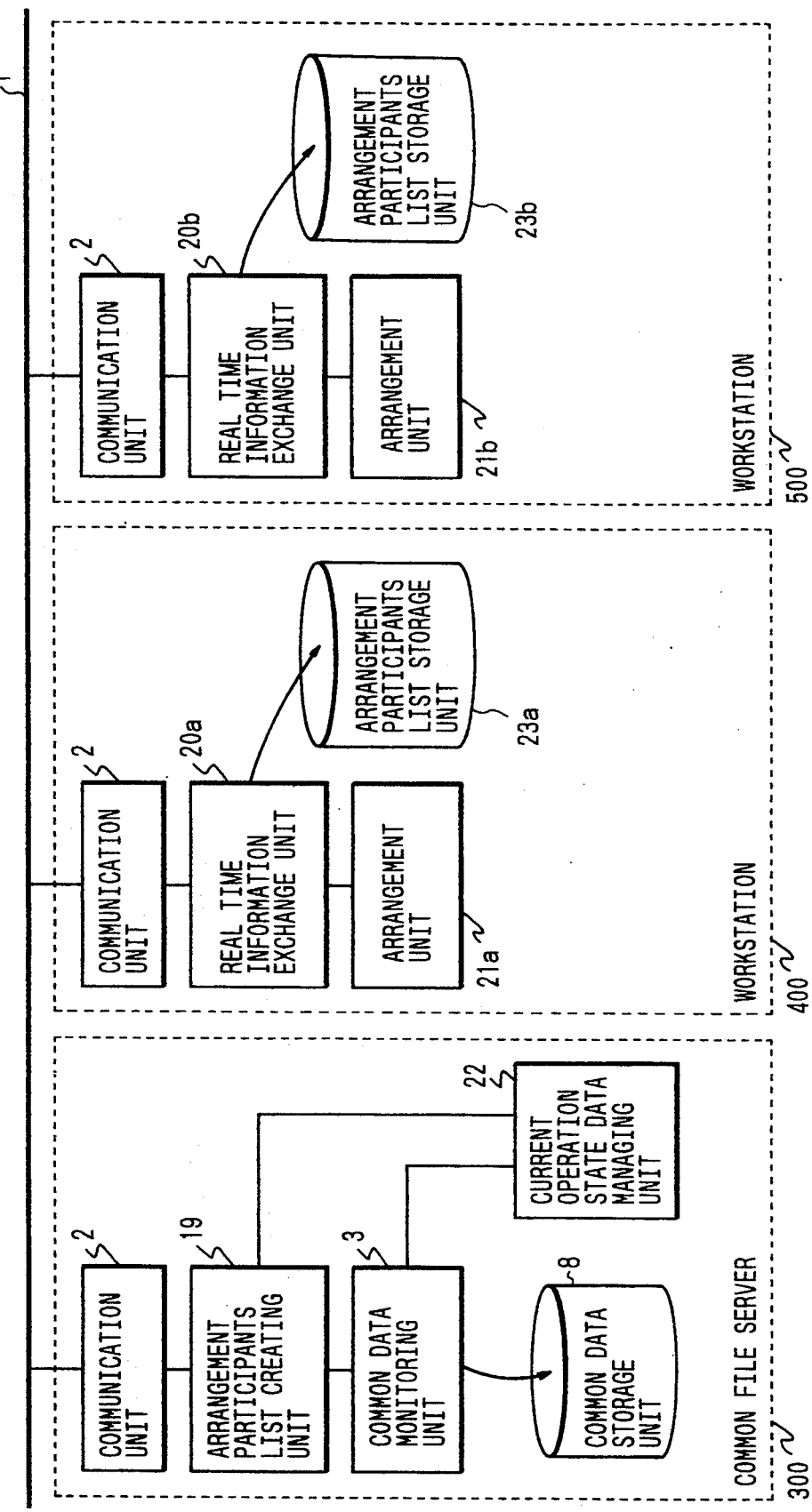
FIG. 2 is a block diagram showing a second embodiment of the cooperative operation system according to the invention.

FIG. 6 is a view showing the structure of arrangement participant information which is created by the arrangement participant list creating unit 11 shown in FIG. 2. As shown in FIG. 6, this information includes information on a list of pairs each including an arrangement participant (user's name) and the address thereof.

FIG. 7 is a view showing an example of a screen display on a window which is displayed by the notifying level setting unit 10 shown in FIG. 1 and also which is used to set the notifying levels. In this embodiment, the window is structured such that the contents of the operations and the select items of the notifying levels corresponding to the operation contents are displayed and thus the notifying levels can be set by selecting one of the select items thereof. Also, there is provided a column in which the limitation of the operator is input.

FIGS. 8 and 9 are views showing examples of a screen display on a window which is displayed by the notifying information display unit 6 shown in FIG. 1. Specifically, FIG. 8 illustrates a display obtained when the notifying level is an immediate display, in which the names of items including file name to be notified, content of operation, operator's name, notifying destination and the like are displayed, and the information corresponding to the respective names of items is also displayed. FIG. 9 illustrates a display obtained when the notifying level is a storage, in which, when the file is specified, similar information to that in FIG. 8 is read out from the notifying information storage unit 7 and is displayed.

Figure 10:
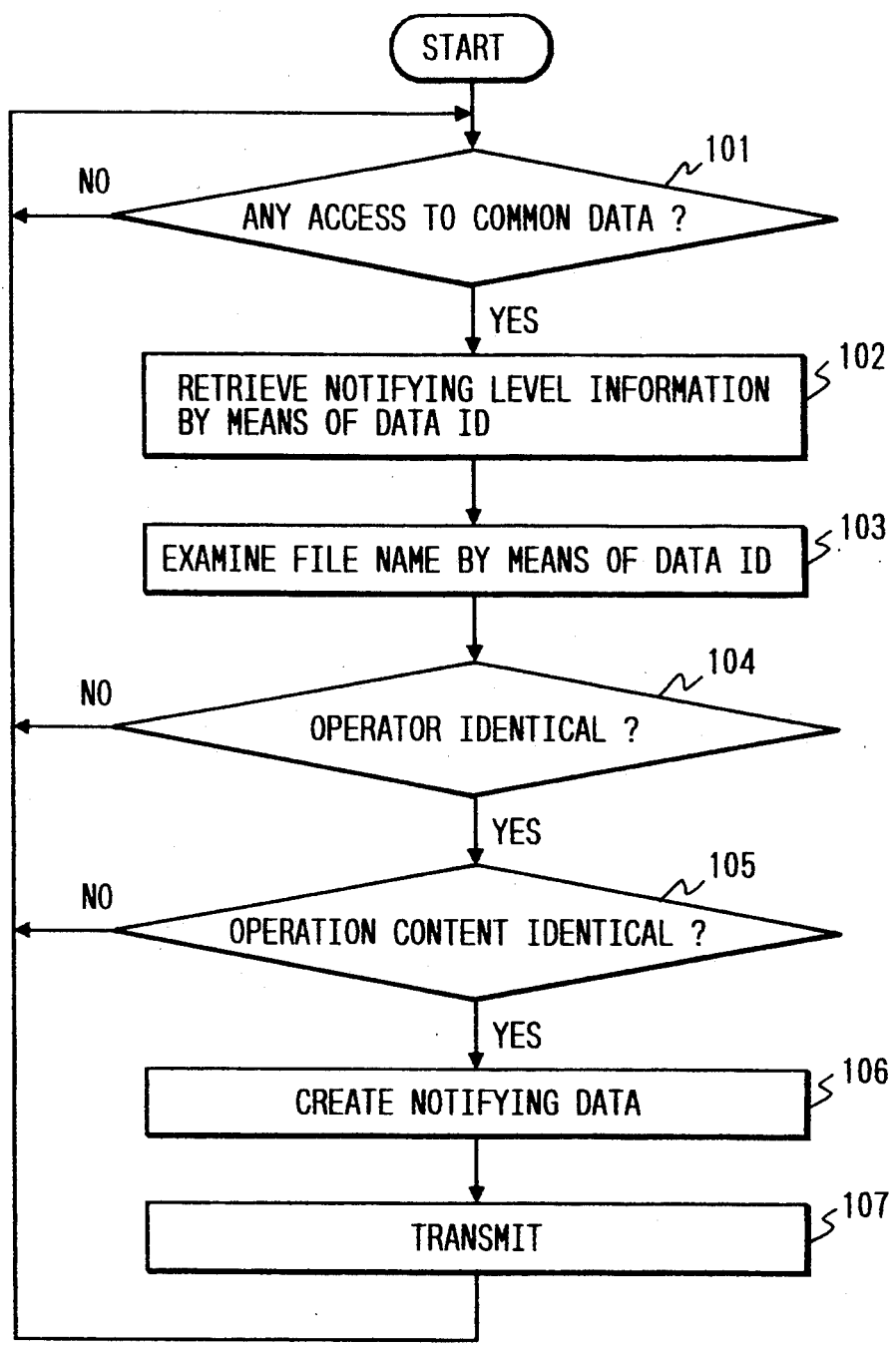
FIG. 10 is a flow chart showing control of a notifying processing in the server.

FIG. 10 is a flow chart showing control which is exercised in the common file server 100 when the common data is operated by the operator. In particular, at first, in Step 101, it is checked whether there exists any access to the common data or not. If not, then the processing in Step 101 is performed again. If there exists any access to the common data, then the processing advances to Step 102, in which the notifying level information is retrieved by means of the data ID, and then the processing goes to Step 103, in which a file name is examined by means of the data ID. Next, the processing advances to Step 104, in which it is checked whether the operator is identical with the column of the operator limitation of the notifying level information. If not identical, then the processing goes back to Step 101. If identical or no operator limitation, then the processing goes to Step 105, in which it is checked whether the operation content is identical with the column of the notifying level of the notifying level information or not. If not, then the processing goes back to Step 101. If identical, then the processing advances to Step 106, in which notifying data is created and the processing advances to Step 107, in which the notifying data is transmitted. After then, the processing goes to Step 101.

Figure 11:
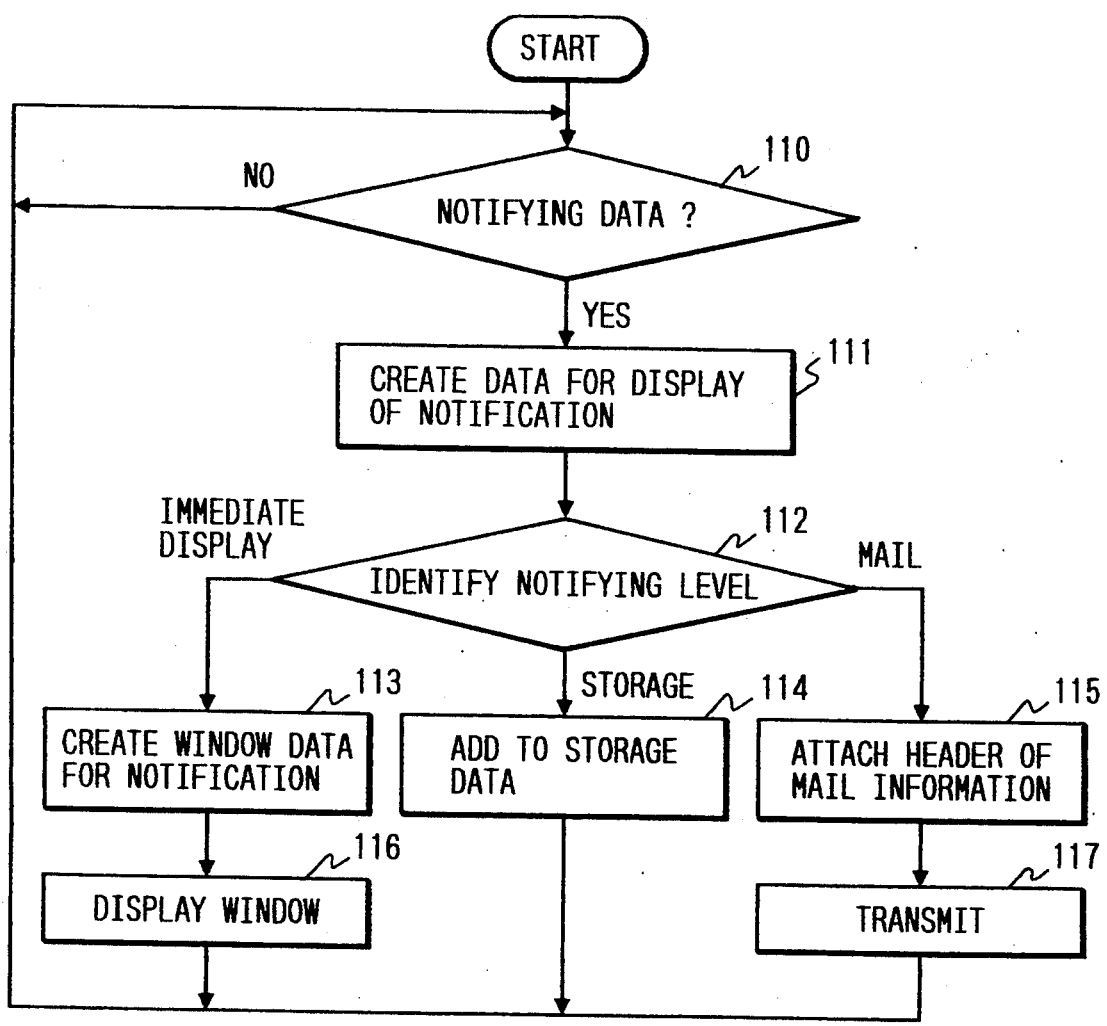
FIG. 11 is a flow chart showing control of a notifying processing in the workstation.

FIG. 11 is a flow chart showing control which is exercised when the communication unit 2 of the workstation receives the notifying information. At first, in Step 110, it is checked whether there exists the notifying data or not. If not, then the processing in Step is performed again. If there exists the notifying data, then the processing advances to Step 111, in which data for display of notification is created.

Next, the processing goes to Step 112, in which the notifying level is identified. If the notifying level is an immediate display, then the processing advances to Step 113, in which window data for notification is created and the processing advances to Step 116, in which the window for notification is displayed. After then, the processing goes back to Step 110.

If the notifying level is a storage, then the processing goes to Step 114, in which the notifying information is added to the storage data and after then the processing returns back to Step 110. If the notifying level is a mail, then the processing goes to Step 115, in which the header of the mail information is attached to the notifying information. Then, the processing goes to Step 117, in which the notifying information is transmitted as an electronic mail and after then the processing returns back to Step 110.

Figure 12:
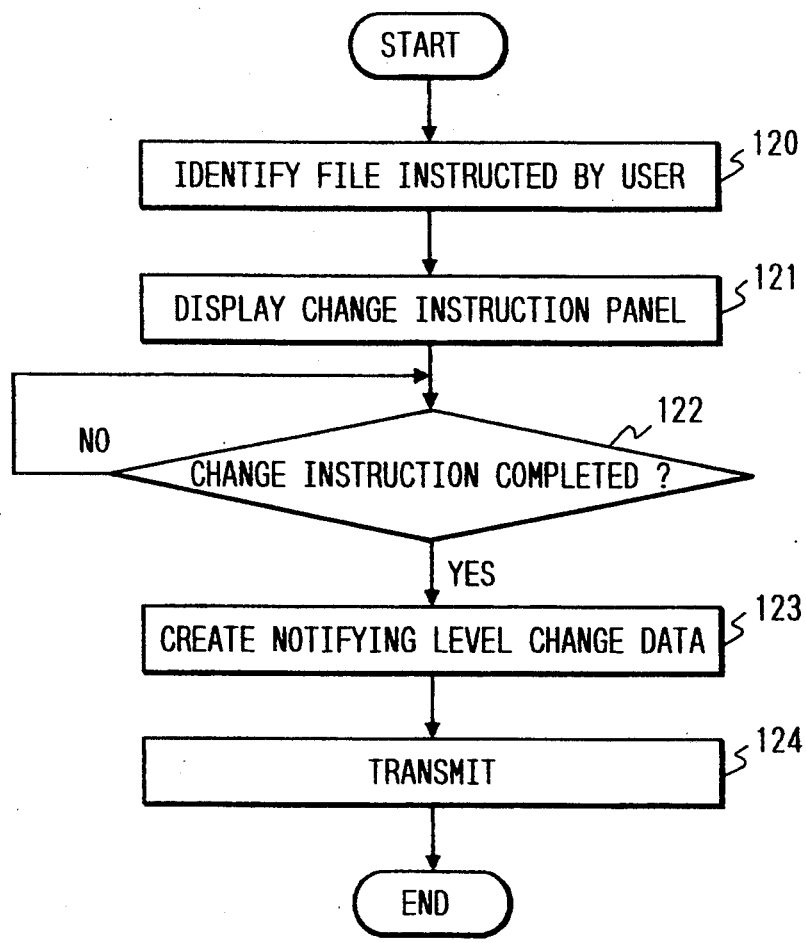
FIG. 12 is a flow chart showing control of a notifying level change processing in the workstation.

FIG. 12 is a flow chart showing control which is exercised in the workstation when the operator changes the notifying level. At first, in Step 120, the file that is instructed by a user is identified. Next, the processing goes to Step 121, in which there is displayed a change instruction panel which allows the operator to perform a change instruction and then the processing goes to Step 122, in which the workstation waits for the completion of the change instruction. Next, the processing goes to Step 123, in which notifying level change data is created and then the processing advances to Step 124, in which the notifying level change data is transmitted.

Figure 13:
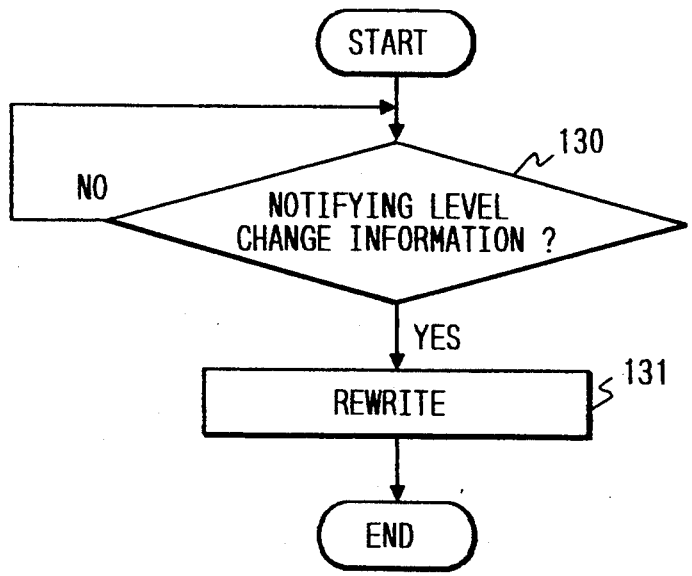
FIG. 13 is a flow chart showing control of a notifying level change processing in the server.

FIG. 13 is a flow chart showing control which is exercised when the communication unit 2 receives the notifying level change information. At first, in Step 130, it is checked whether there exists the notifying level change information or not. If not, then the processing in Step 130 is performed again. If there exists the notifying level change information, then the processing advances to Step 131, in which the notifying level information is rewritten on the basis of the received notifying level change information.

In the above-mentioned first embodiment of the invention, the information is transmitted by means of the network as communication means, but the invention is not limited to this and other means may be employed. For example, when the structural means of the invention exists within the same workstation, the information may be communicated between processes or may be communicated by use of a bus.

Also, in the above embodiment of the invention, the communicable workstation information hold unit 17 holds the communicable workstation information. Alternatively, however, the hold unit 17 may be structured such that it holds the information on the workstation which has failed in information notification and that it judges whether the information can be transmitted to the communication means or not. Of course, in this case, the information from the communicable state notifying unit 18 is not added to the information of the workstation but it is deleted from the workstation information.

Referring now to FIG. 2, there is shown a block diagram of a second embodiment of the cooperative operation system according to the invention. Of course, the second embodiment includes the composing elements shown in FIG. 1, although they are omitted in FIG. 2. The present system includes a common file server 300 and a plurality of workstations 400 and 500 respectively utilizing the common data, both of which are connected to a network 1. In order words, the present cooperative operation system includes the composing elements 2 to 18 shown in FIG. 1 and composing elements 19 to 23 shown in FIG. 2, which are connected to one another by means of the network 1 consisting of, for example, Ethernet. Reference numeral 2 designates a communication unit which is connected to the network 1. Description will be given below of the respective composing elements.

The workstations 400 and 500 each includes a real time information exchange unit 20 (20a, 20b) which transmits an arrangement target range specified by the operator to an arrangement participants list creating unit 19 through the network 1.

The arrangement participants list creating unit 19, on the basis of the common data, creates an arrangement participants list, which includes the names of the operators falling within the arrangement target range and the communication addresses of the workstations being used by the operators and the like, and transmits the arrangement participants list to the real time information exchange units 20a and 20b.

On receipt of the arrangement participants list, the real time information exchange units 20a and 20b exchange information in real time by means of the communication address of the arrangement participant data.

A current operation state data managing unit 22, responsive to an inquiry about the operation state of the common data from arrangement participants list creating unit 19, transmits its holding current state data to the arrangement participants list creating unit 19. Also, a common data monitoring unit 3, when the operator performs an operation on the common data, transmits the content of the operation, the name of the operator and the operation target data to the current operation state data managing unit 22. When the unit 22 receives from the common data monitoring unit 3 the information that the operator has performed the operation on the common data, the current state data managing unit 22 updates the current state data in accordance with the received information.

Figure 14A:
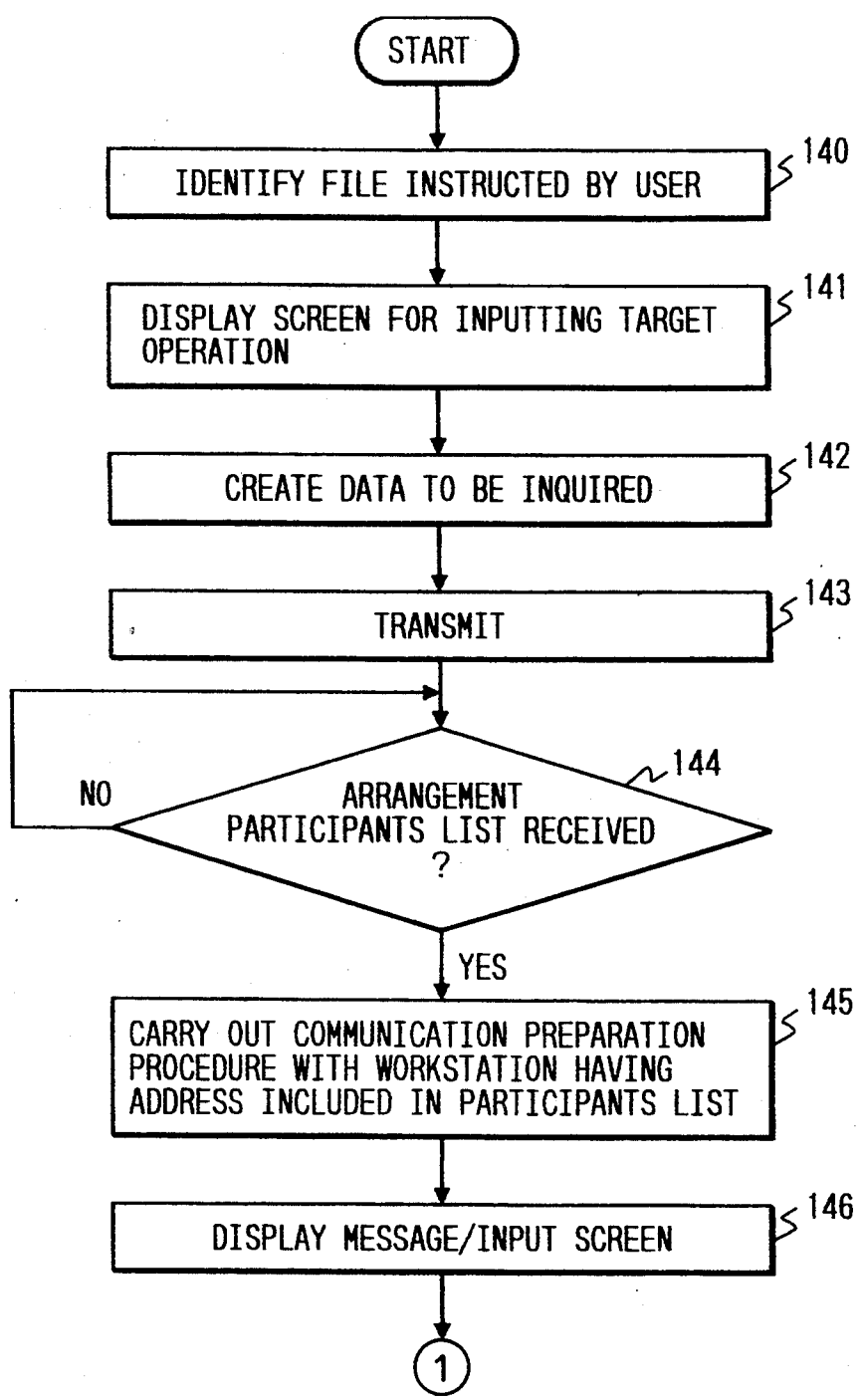
FIG. 14(a) and 14(b) are flow charts showing control of an arrangement processing in the workstation.
Figure 14B:
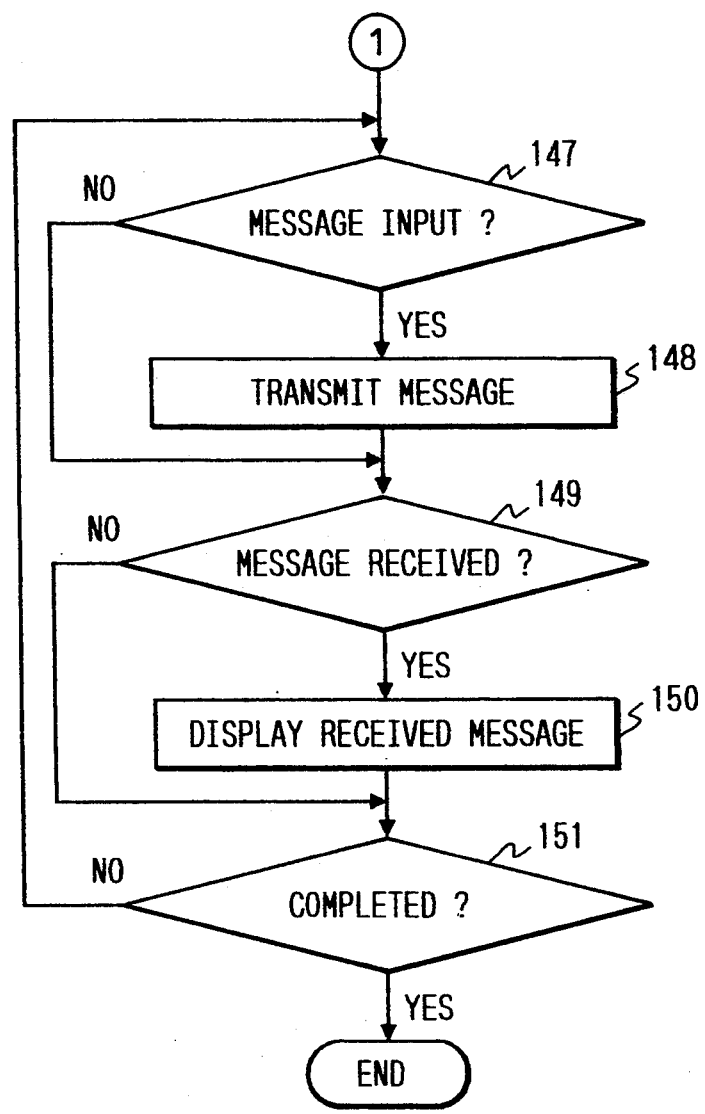

FIGS. 14(a) and 14(b) are flow charts showing control which is exercised in the workstation when an operator exchanges a message in real time with the other operator. At first, in Step 140, a file instructed by the user (the arrangement participant) is identified and the processing advances to Step 141, in which there is displayed a screen into which the operator inputs the target operation.

Next, the processing advances to Step 142, in which there is created data to be inquired of the server. Then, the processing advances to Step 143, in which the inquiry data is transmitted and the processing goes to Step 144, in which it waits for an answer from the server. In Step 144, it is checked whether the workstation has received the arrangement participants list from the server or not. If not, then the processing in Step 144 is performed again. If it has received the list, then the processing goes to Step 145, in which a communication preparation procedure is carried out with the workstation having the address included in the participants list. Then, the processing advances to Step 146, in which the message is displayed and the input screen is displayed.

Next, the processing advances to Step 147, in which it is checked whether the message from the operator has been input or not. If not, then the processing goes to Step 149. If the message has been input, then the processing advances to Step 148, in which the message is transmitted to the workstation with which the above-mentioned communication preparation procedure has been carried out.

Next, in Step 149, it is checked whether the message from the workstation with which the communication preparation procedure has been carried out has been received or not. If the message has been received, then the processing goes to Step 150, in which the received message is displayed and then the processing goes further to Step 151. Next, in Step 151, it is checked whether the message exchange has been completed or not and, if not, then the processing returns back to Step 147.

Figure 15:
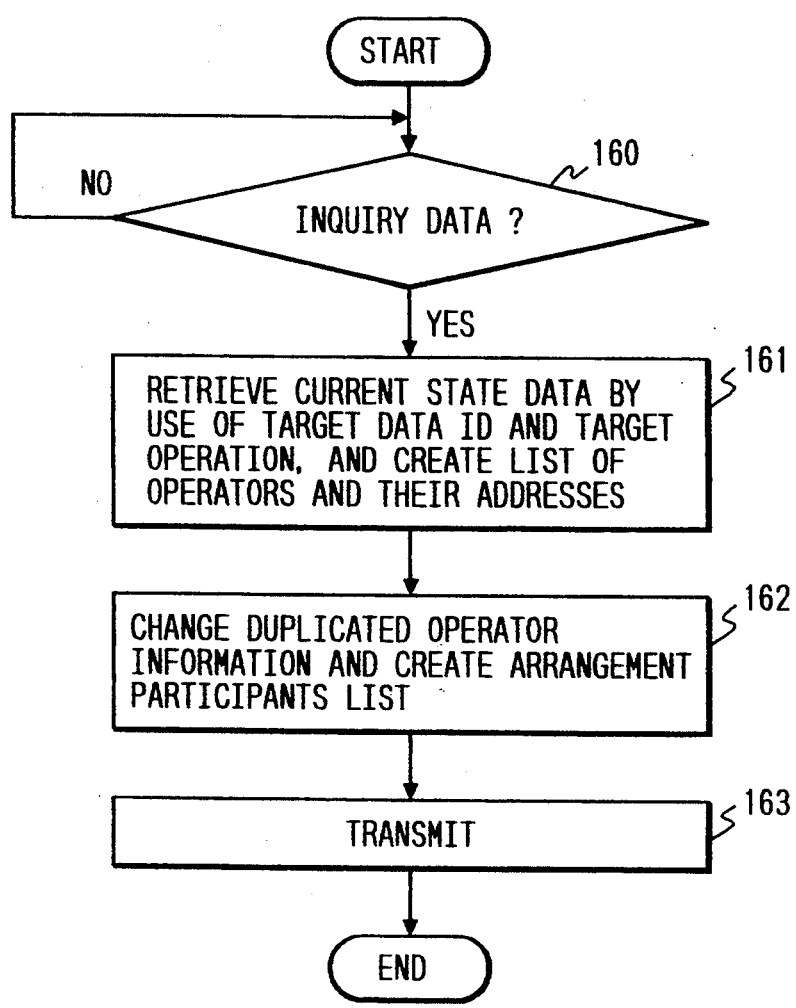
FIG. 15 is a flow chart showing control of an arrangement processing in the server.

FIG. 15 is a flow chart showing control to be exercised when the communication unit 2 of the server has received the inquiry data for arrangement. At first, in Step 160, it is checked whether the inquiry data is present or not. If not, then the processing in Step 160 is performed again. If present, then the processing goes to Step 161, in which the current state data is retrieved by use of the target data ID and the target operation and a list of operators and their addresses is created. Next, the processing advances to Step 162, in which the duplicated operator information is changed into one and an arrangement participants list is created and then the processing advances to Step 163, in which the arrangement participants list is transmitted to the workstation from which the inquiry has been given.

In the above-mentioned second embodiment, the information is transmitted by means of the network as the communication means. However, the invention is not limited to this but, when the composing means of the invention exist in the same workstation, the information may be communicated between processes or may be communicated by means of a bus.

As has been described heretofore, according to the invention, due to the fact that the operations on the commonly shared electronic documents and hyper texts performed by the collaborators are notified automatically and at a time when the operations are performed, the states of the collaborators can be known easily and thus an interaction with the collaborators can be started at operator's own judgment, that is, the cooperative operations can be performed at the most suitable timing.

What is claimed is:

1. A cooperative operation system in which each one of a plurality of operators performs an operation on common data, said system comprising:
   common data monitoring means for monitoring each operation performed on the common data and for generating monitoring data;
   notifying level information storage means for storing notifying level information used to determine an appropriate notifying mode from a plurality of notifying modes in which each of the operators is notified of the operations on the common data performed by the other operators;

notifying information creating means, triggered by the transmission of the monitoring data from said common data monitoring means and referring to the notifying level information from said notifying level information storage means, for deciding for of notification and each of the operators to be notified by creating notifying information notifying information decoding means for decoding the notifying information and for determining the appropriate notifying mode corresponding to a notifying level included in the decoded notifying information; and notifying information supply means for supplying the notifying information to the operators in accordance with the notifying mode decided by said notifying information decoding means.

2. The cooperative operation system as recited in claim 1, wherein the notifying level includes an immediate display level for displaying the notifying information immediately, a storage level for storing the notifying level, and an electronic mail level for transmitting the notifying information as an electric mail.

3. The cooperative operation system as recited in claim 2, further comprising notifying information display means and notifying information storage means, wherein said notifying information display means displays the notifying information when the notifying level decoded by said notifying information decoding means is an immediate display level, and said notifying information storage means stores the notifying information when the notifying level decoded by said notifying information decoding means is a storage level.

4. The cooperative operation system as recited in claim 1, further comprising notifying level setting means for setting a change of the notifying level information, and notifying level change means for changing the notifying level information stored in said notifying level storage means in accordance with the setting of said notifying level setting means.

5. The cooperative operation system recited in claim 1, further comprising:
- a common data managing means for managing the common data and including said common data monitoring means, said notifying level information storage means, and said notifying information creating means;
- a workstation to be used by each of the operators including said notifying information decoding means; and
- a network interconnecting the common data managing means and the workstation.

6. The cooperative operation system as recited in claim 5, wherein said workstation includes notifying level inquiry means and notifying level information look means, wherein said notifying level inquiry means allows said workstation to inquire of the notifying level information of said common data managing means, and said notifying level information look means looks through the notifying level information that is specified by respective operators.

7. The cooperative operation system as recited in claim 6, further comprising look information display selecting means for determining, when the notifying level information is looked through by said notifying level information look means, the necessity of display and for transmitting only the information necessary for display.

8. The cooperative operation system as recited in claim 5, further comprising notifying failure data storage means for storing notification-failed notifying information when said common data managing means has notified said workstation of information but has failed in the notification of the information for some reason and notification failure data take-out means for taking out the notification-failed notifying information from the workstation of the operator and displaying the notification-failed notifying information.

9. The cooperative operation system as recited in claim 8, further comprising communicable workstation information hold means for holding information on a communicable workstation which is used by an operator involved with the common data, and communicable state notifying means for detecting that said workstation is changed from its uncommunicable state to its communicable state and notifying said common data managing means that said workstation is in the communicable state.

10. The cooperative operation system as recited in claim 5, further comprising an arrangement participants list creating means for creating a list of arrangement participants including the communication addresses thereof, real time information exchange means for exchanging a message through communication means on the basis of the arrangement participants list, and arrangement means including a user interface for controlling the display of the message and specifying operations to input the message and create the arrangement participants list.

11. The cooperative operation system as recited in claim 10, further comprising common data current operation state data managing means for managing the current operation state of the common data so as to eliminate the need to always check the current operation state of said common data each time an inquiry is made by said workstation.

* * * * *

UNITED STATES PATENT AND TRADEMARK OFFICE
CERTIFICATE OF CORRECTION

PATENT NO. : 5,408,662
DATED : April 18, 1995
INVENTOR(S) : Hiroshi KATSURABAYASHI It is certified that error appears in the above-indentified patent and that said Letters Patent is hereby corrected as shown below:

Claim 1, Column 11, Line 5 change "for" (second occurrence) to --forms--.

Claim 1, Column 11, Line 7 after "information" insert --;--.

Signed and Sealed this

Fifth Day of September, 1995

Attest:

BRUCE LEHMAN

Attesting Officer    Commissioner of Patents and Trademarks